US005903071A

United States Patent [19]

[11] Patent Number: 5,903,071
[45] Date of Patent: May 11, 1999

Miyasaka et al.

[54] SMALL ELECTRIC APPARATUS EQUIPPED WITH GENERATOR

[75] Inventors: Kenji Miyasaka; Noritoshi Suzuki; Hiroo Enomoto; Tadashi Hanaoka, all of Tanashi, Japan

[73] Assignee: Citizen Watch Co., Ltd., Tokyo, Japan

[21] Appl. No.: 08/836,135

[22] PCT Filed: Sep. 12, 1996

[86] PCT No.: PCT/JP96/02604

§ 371 Date: May 14, 1997

§ 102(e) Date: May 14, 1997

[87] PCT Pub. No.: WO97/10534

PCT Pub. Date: Mar. 20, 1997

[30] Foreign Application Priority Data

Sep. 13, 1995 [JP] Japan .................................... 7-234833

[51] Int. Cl.[6] .............................. H02K 33/00; G04B 1/00
[52] U.S. Cl. .............................................. 310/38; 368/204
[58] Field of Search ................................. 310/36, 37, 38; 368/64, 204

[56] References Cited

FOREIGN PATENT DOCUMENTS

| | | |
|---|---|---|
| 0 170 303 | 2/1986 | European Pat. Off. . |
| 0 681 228 | 11/1995 | European Pat. Off. . |
| 1056388 | 2/1954 | France . |
| 52-85851 | 7/1977 | Japan . |
| 51-129610 | 4/1978 | Japan . |
| 53-77560 | 7/1978 | Japan . |
| 6-500169 | 3/1992 | Japan . |
| 57-184992 | 11/1995 | Japan . |
| 92/04662 | 3/1992 | WIPO . |

*Primary Examiner*—Nestor Ramirez
*Assistant Examiner*—Peter Medley
*Attorney, Agent, or Firm*—Kanesaka & Takeuchi

[57] ABSTRACT

A small electronic apparatus that transmits mechanical energy obtained by rotational or reciprocating motion of a rotary weight to a power genetrator rotor to produce electrical energy so as to operate itself. The apparatus includes a power transmission mechanism for accelerating the rotation of the rotary weight; a power generator rotor driven by the power transmission mechanism; and a generator coil block inducing voltage based on the driving of the power generator rotor, wherein at least one shock-absorbing spring is provided between the rotary weight and the power generator rotor.

7 Claims, 13 Drawing Sheets

SMALL ELECTRIC APPARATUS EQUIPPED WITH GENERATOR

BACKGROUND OF THE INVENTION

1. Field of the Invention

This invention relates to a small electronic apparatus equipped with a generator which converts mechanical energy obtained by the rotational or reciprocating motion of a rotary weight to electrical energy, especially to a small electronic apparatus equipped with a generator, which exhibits improved impact resistance in a mechanical power transmission mechanism in the generator and exhibits improved generating efficiency.

2. Description of the Background Art

An electronic wristwatch is one of small electronic apparatuses in which mechanical energy obtained by rotary motion or reciprocating motion of a rotary weight is converted into electric energy, enabling the apparatuses to be operated.

In a generator of such an electronic wristwatch, there is a problem that when the rotary weight is hit by a strong impact caused by dropping the wristwatch or the like, support materials, gears, and pinion gears for the mechanical power transmission mechanism of the rotary weight are damaged or the ICs are broken.

There have been methods disclosed, for example, in Japanese Patent Application Laid-open No. 128286/1988 aiming to avoid damages to the mechanical power transmission mechanism of the rotary weight to improve the impact resistance.

Specifically, a device disclosed in Japanese Patent Application Laid-open No. 128286/1988 comprises a slip device which transfers motive force to the power transmission mechanism by a frictional force. The slip device slips to avoid transfer of a strong impact load torque applied to the power transmission mechanism when a strong impact is applied to the rotary weight. Also, the rotational velocity transferred to the rotor is restrained by the slip action of the slip device to protect the charge control circuit from damages caused by a high voltage induced in a coil for a generator because of high rotation of a generator rotor due to an impact on the rotary weight.

Almost the same method as in Japanese Patent Application Laid-open No. 128286/1988 is disclosed in International Patent Application Laid-open No. W089/06833.

Also, as prior art, FIG. 5 described in Japanese Patent Application Laid-open No. 91992/1991 shows the provision of a rotary weight itself provided with a spring structure which is resistant to an impact on the rotary weight. By this prior art, the effect of absorbing an impact torque in the direction along the rotation of the rotary weight can be expected.

However, in the prior art of Japanese Patent Application Laid-open No. 128286/1988 and International Patent Application laid-open No. W089/06833, in which the slip device is provided in the power transmission mechanism of the rotary weight, it is necessary to reduce the slip torque to less than the mechanical strength limit of tenons, gears, or the like. The slip torque must be designed to have a considerably small value taking safety into consideration.

If the rotational force transferred to the power transmission mechanism of the rotary weight is higher than the slip torque, the slip device assembled in the power transmission mechanism slips to run idle with the rotation of the rotary weight. Therefore, the rotor does not follow the rotation, resulting in a reduction in generating efficiency.

In the prior art shown in FIG. 5 in Japanese Patent Application Laid-open No. 91992/1991, in which the rotary weight itself is provided with the spring structure, if it is intended to provide the rotary weight with an appropriate spring structure to prevent the power transmission mechanism from destructive impact, the stiffness of the rotary weight itself is reduced. When the rotary weight is subjected to a strong impact, it tends to be deformed.

This invention has been achieved in view of this situation and has an object of providing a small electronic apparatus equipped with a generator having a high generating efficiency without slip, differing from the conventional power transmission mechanism.

Another object of the present invention is to provide a small electronic apparatus provided with a generator which protects the power transmission mechanism from destructive impact, differring from the conventional power transmission mechanism, even if such destructive impact is applied to a rotary weight.

Disclosure of the Invention

The above objects can be attained in the present invention for a small electronic apparatus equipped with a generator which converts mechanical energy obtained by the rotational or reciprocating motion of a rotary weight to electrical energy. The generator comprises:

- a power transmission mechanism for accelerating the rotational or reciprocating motion of the rotary weight;
- a power generator rotor driven by the power transmission mechanism; and
- a coil block for inducing voltage based on the rotation of the power generator rotor, wherein at least one shock-absorbing spring is provided between the rotary weight and the power generator rotor.

This structure reduces the impact transferred from the power transmission mechanism to the power generator rotor when a strong impact is applied to the rotary weight, because the shock-absorbing spring bends to absorb the rotating energy. Therefore, destruction of gears, their support materials, pinions, and the like of the power transmission mechanism is avoided and induction of high voltage in the generator coil can be prevented.

DETAILED DESCRIPTION OF THE INVENTION AND PREFERRED EMBODIMENTS

The present invention will now be explained in detail with reference to the drawings.

In this embodiment, an example of an electronic wristwatch will be explained as the small electronic apparatus equipped with a generator.

First Embodiment

Figure 1:
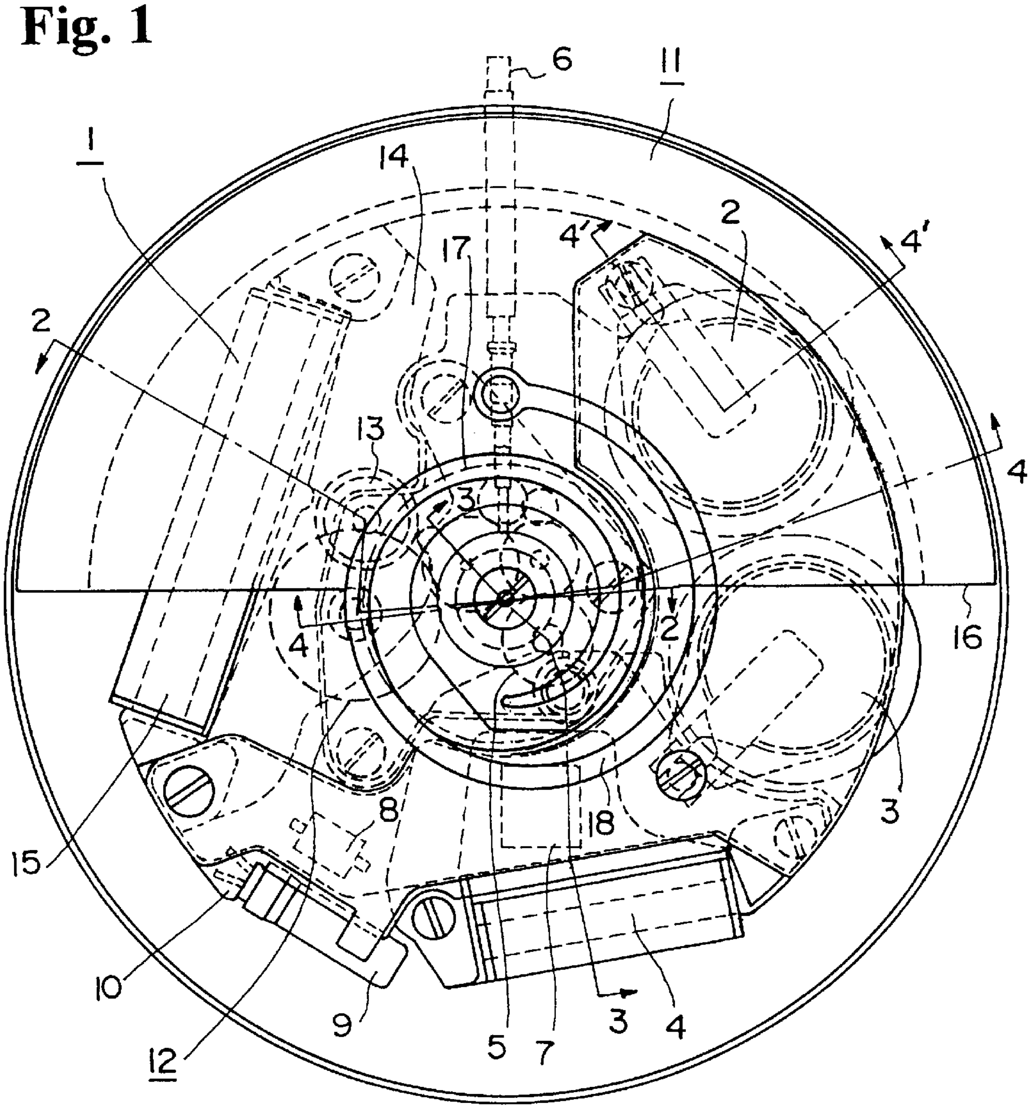
FIG. 1 is an internal top plan view of a first embodiment of an electronic wristwatch.
Figure 2:
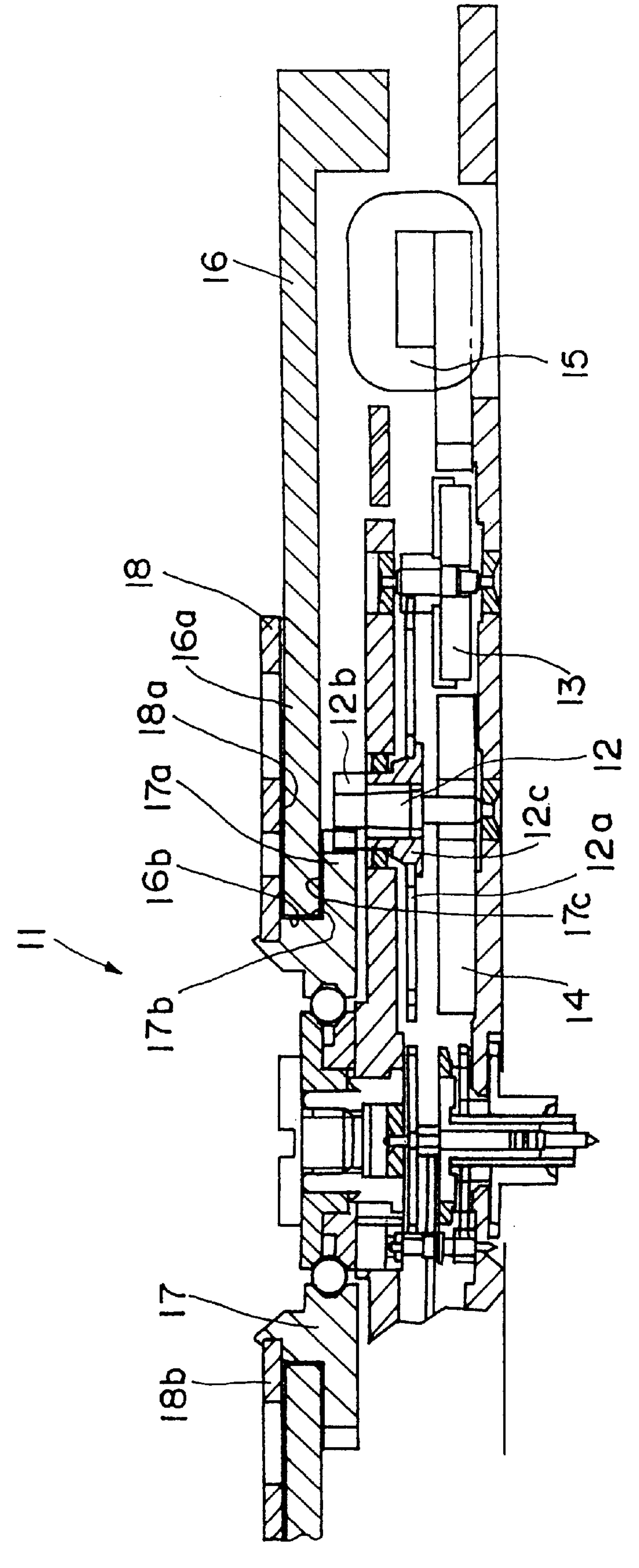
FIG. 2 is an enlarged sectional view along the line 2—2 in FIG. 1.
Figure 3:
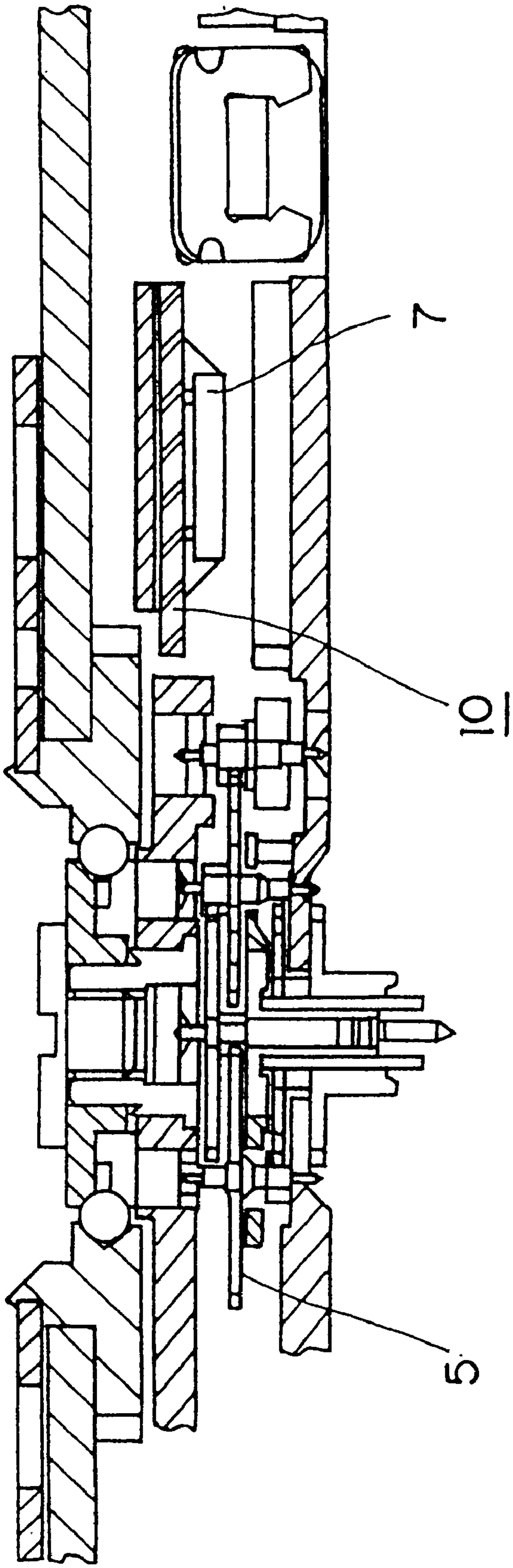
FIG. 3 is an enlarged sectional view along the line 3—3 in FIG. 1.
Figure 4:
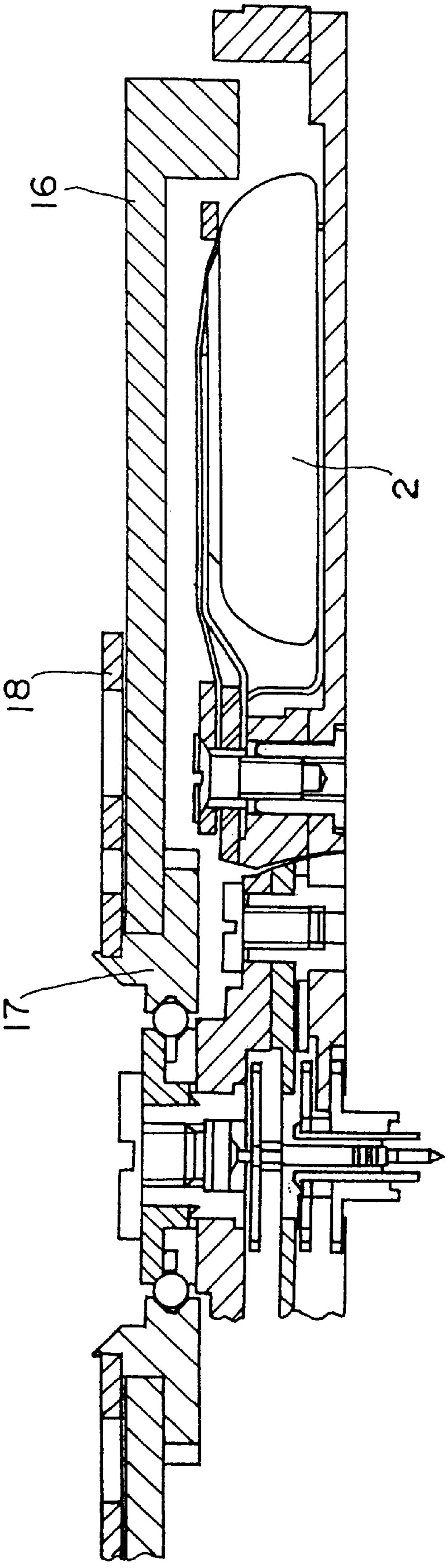
FIG. 4 is an enlarged sectional and overlaid view along the lines 4—4 and 4'—4' in FIG. 1.

FIG. 1 is an internal top plan view of a first embodiment of an electronic wristwatch, FIG. 2 is an enlarged sectional view along the line 2—2 in FIG. 1, FIG. 3 is an enlarged sectional view along the line 3—3 in FIG. 1, FIG. 4 is an enlarged sectional and overlaid view along the lines 4—4 and 4'—4' in FIG. 1.

This electronic wristwatch comprises a generator 1 for converting kinetic energy to electrical energy, storage cells 2, 3 acting as a secondary battery, a time-driving motor 4 rotated by a power source from the storage cells 2, 3, a train wheel part 5 for transferring the rotation of the motor 4 to a time display with a pointer (not shown), a winding stem 6 for revising the indicated time of the pointer, a circuit chip 7, a diode 8, a composite circuit 10 on which a crystal oscillator 9 and the like are mounted, and the like.

The generator 1 comprises a rotary weight block 11, an energy intermediate wheel 12 for a generator including an energy intermediate gear 12*a* for a generator, an energy intermediate pinion 12*b*, an energy intermediate pinion ring 12*c*, a generator rotor 13, a generator stator 14, and a generator coil block 15.

Figure 5:
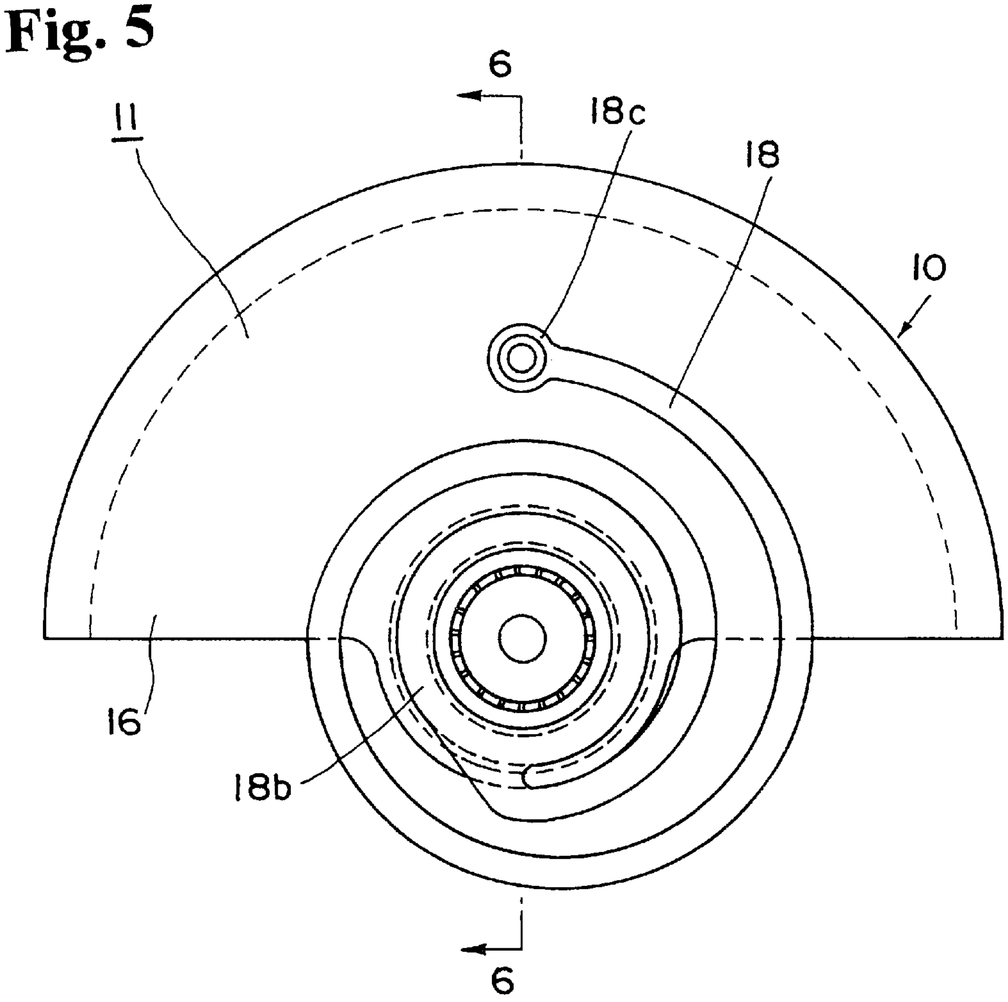
FIG. 5 is a top plan view of a rotary weight block corresponding to the first embodiment.
Figure 6:
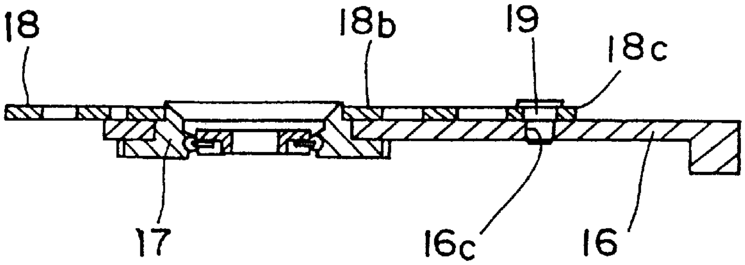
FIG. 6 is a sectional view along the line 6—6 in FIG. 5.

FIG. 5 is a top plan view of the rotary weight block 11 and FIG. 6 is a sectional view along the line 6—6 in FIG. 5.

The rotary weight block 11 comprises a rotary weight 16, a weight pinion 17, and a spiral shock-absorbing spring 18.

The above structure will be explained in more detail with reference to FIGS. 1–6.

As shown in FIG. 2, a pinion 17*a* of the weight pinion 17, a support 16*a* of the rotary weight 16, and the shock-absorbing spring 18 are disposed so as to form three layers in the center of the rotary weight 11. An engaging part 17*b* of the weight pinion 17 is inserted with a margin into a rotational center hole 16*b*. Also, the rotary weight 16 is supported with an appropriate clearance by and between a pinion top 17*c* of the weight pinion 17 and a bottom surface 18*a* of the shock-absorbing spring 18. Specifically, the rotary weight 16 is rotationally supported free from the weight pinion 17.

Also, a spring center 18*b* of the shock-absorbing spring 18 is secured to the weight pinion 17. A spring edge 18*c* is secured in a pin hole 16*c* of the rotary weight 16 by a pin 19 in a rotationally free condition. The rotational motion of the rotary weight 16 is transferred to the weight pinion 17 via the shock-absorbing spring 18.

By this structure, mechanical energy produced by the rotational motion or reciprocal motion of the rotary weight 16 is transferred to the weight pinion 17 via the shock-absorbing spring 18 and further transferred from the weight pinion 17 to the generator rotor 13 via the generator energy intermediate wheel 12 by which the motion is accelerated. Specifically, the generator rotor 13 is rotated at a high speed to convert mechanical energy to electric energy.

Here, the spring constant of the shock-absorbing spring is designed as follows:

In a case of the rotational force of the rotary weight under ordinary carrying conditions of an electronic wristwatch which is worn on the human wrist, the spring constant is designed so that the shock-absorbing spring 18 is only slightly deformed. In this case, the rotary weight 16 and the weight pinion 17 rotate almost in unity.

On the other hand, in the case where the rotary weight is rapidly rotated caused by some reason such as dropping the wristwatch, violent shaking of the hand, or the like, the shock-absorbing spring 18 bends to absorb the rotational energy so that the impact force of the rotary weight is not directly transferred to the weight pinion 17 and the power transmission mechanism succeeding the weight pinion 17.

Incidentally, in the above embodiment, an example of an integrated rotary weight 16 is illustrated. However, the rotary weight may be a composite of two or more elements. Also, only one storage cell may be used as the secondary battery.

Experimental Example

If the spring force of the shock-absorbing spring 18 is too strong, the bending angle of the spring becomes small and the spring cannot sufficiently absorb the rotational energy when receiving the impact. On the other hand, if the spring force is too weak, the bending angle of the spring becomes large when receiving the impact. Therefore, the rotational velocity transferred to the power transmission mechanism becomes lower relative to the rotational velocity of the rotary weight, leading to a reduction in generating efficiency.

Therefore, the shock-absorbing spring 18 is designed with a shape as illustrated below. When the accelerating rate of the train wheel between the weight pinion 17 and the generator rotor 13 is designed in a range of from 60 to 100, the thickness of the plane spring is in a range of from 0.2 to 0.3 mm so that it has no influence on the thickness of a watch movement. Also, the width of the spring is in a range from 0.5 to 1.0 mm and the number of turns of the spiral portion is in a range from 1.0 to 3.0. Specifically, the spring is not designed so that an edge 18*c* of the spring extends to the outer periphery of the rotary weight 16. Further, the spring constant (spring torque to a bending angle) of the shock-absorbing spring 18 is designed in a range from 5 gr.cm/degree to 30 gr.cm/degree approximately. It has been confirmed that the shock-absorbing spring 18 designed in the above manner has excellent impact resistance without any fatigue, exhibiting high generating efficiency.

Second Embodiment

Figure 7:
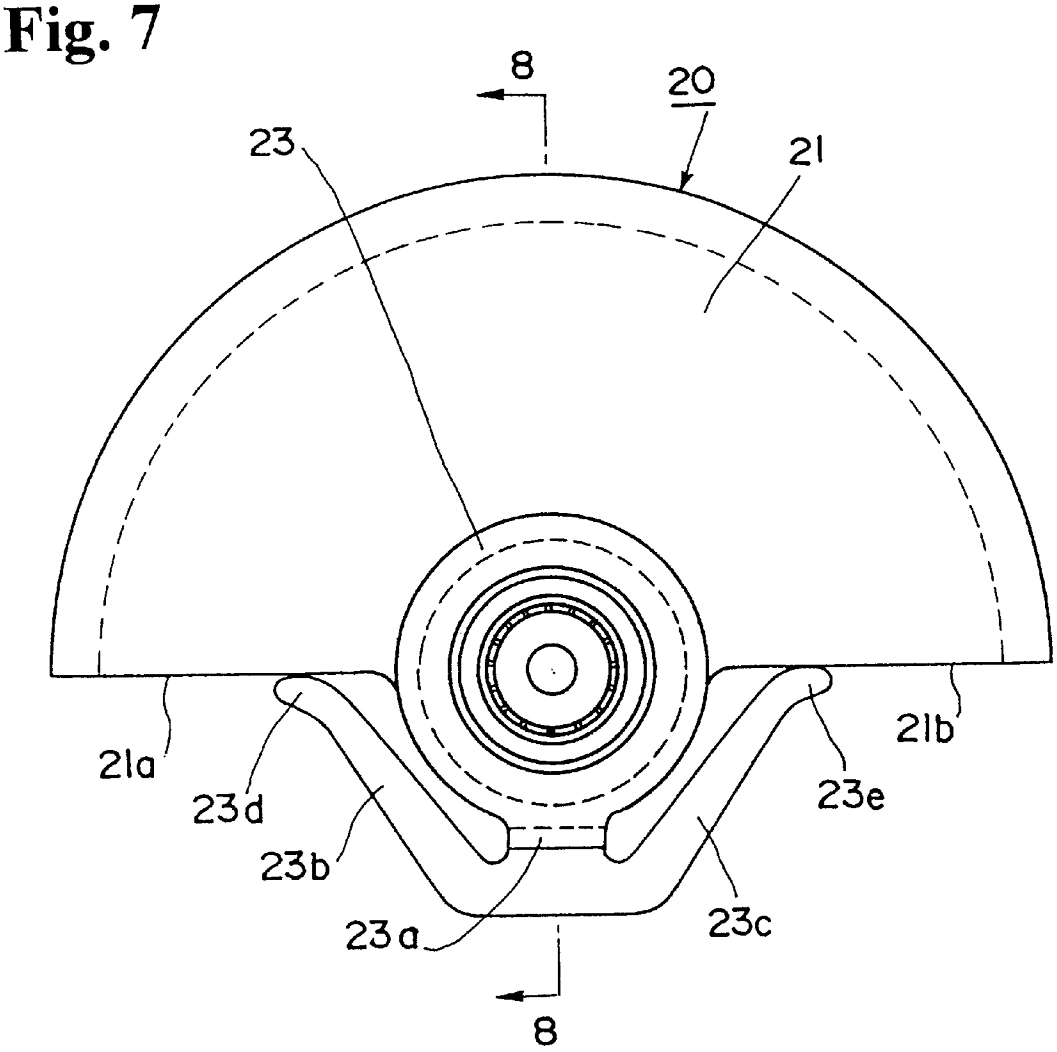
FIG. 7 is a top plan view of a second embodiment of the rotary weight block of the present invention.
Figure 8:
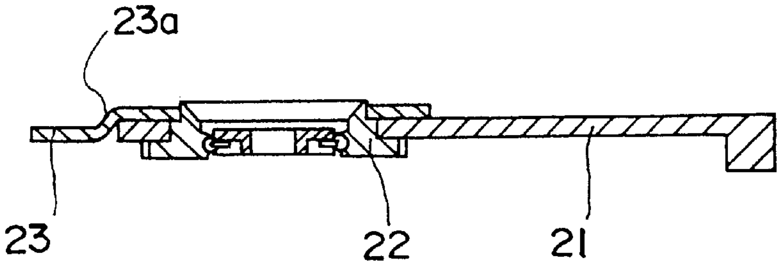
FIG. 8 is a sectional view along the line 8—8 in FIG. 7.

FIG. 7 is a top plan view of a second embodiment of the rotary weight block of the present invention and FIG. 8 is a sectional view along the line 8—8 in FIG. 7.

An rotary weight block 20 comprises a rotary weight 21, a weight pinion 22, and a shock-absorbing spring 23. The fitting conditions between the rotary weight 21 and the weight pinion 22 and between a shock-absorbing spring 23 and the weight pinion 22 are the same as those in the first embodiment. The shock-absorbing spring 23 includes a pair of spring parts 23*b,* 23*c* of an arm shape which extends forward to both sides from a step part 23*a* integrally extending from the weight pinion 22. Respective edges 23*d,* 23*e* of the spring parts 23*b,* 23*c* directly contact the linear side surfaces 21*a,* 21*b* of the rotary weight 21. The spring parts 23*b,* 23*c* bend to absorb rotational energy when impact torque is applied to the rotary weight 21.

The spring parts 23*d,* 23*e* have a curved shape to directly contact the side surfaces 21*a,* 21*b* of the rotary weight 21 and to smoothly slide on these side surfaces 21*a,* 21*b* when the spring parts 23*b,* 23*c* bend.

By this structure, it is not necessary to provide the pin 19 used in the rotary weight block 11. Also, it is advantageous for realizing a thin watch since the sectional heights of the spring parts 23*b,* 23*c* are the same as that of the rotary weight 21.

Third Embodiment

Figure 9:
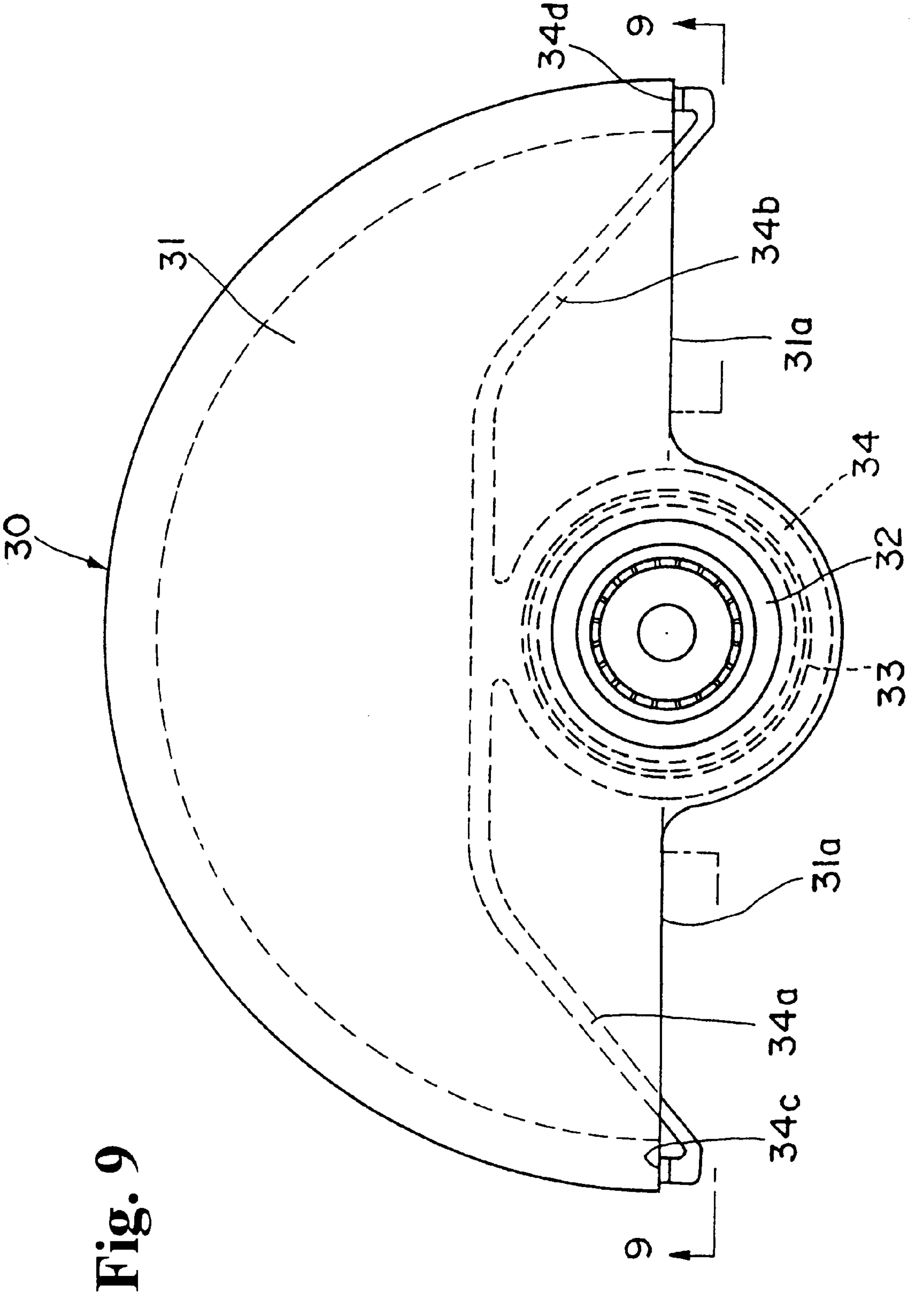
FIG. 9 is a top plan view of a third embodiment of the rotary weight block of the present invention.
Figure 10:
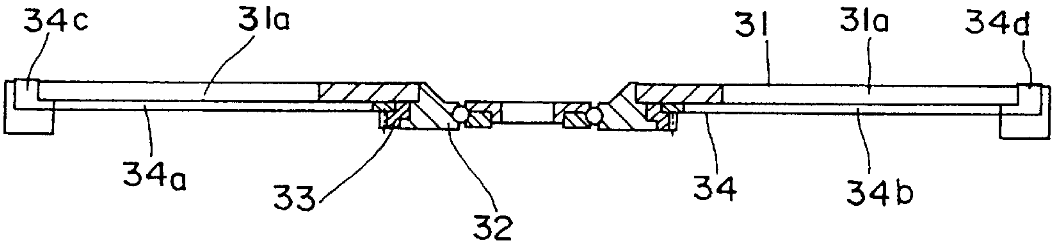
FIG. 10 is a sectional view along the line 10—10 in FIG. 9.
Figure 11:
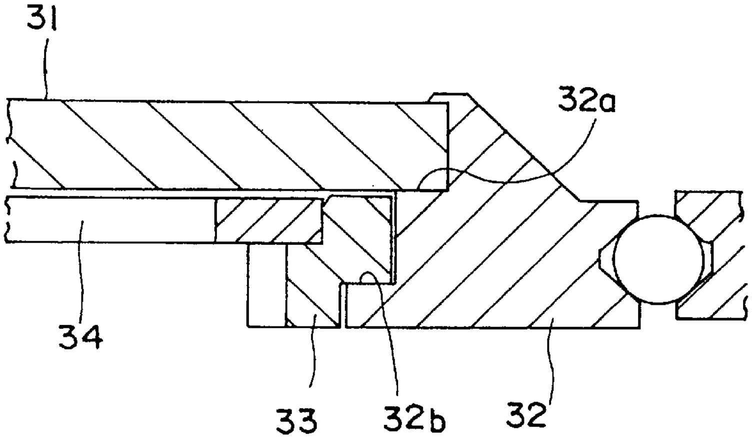
FIG. 11 is a partly enlarged view showing fitting conditions between a weight pinion and a rotary weight and between the weight pinion and a shock-absorbing spring corresponding to the third embodiment.
Figure 12:
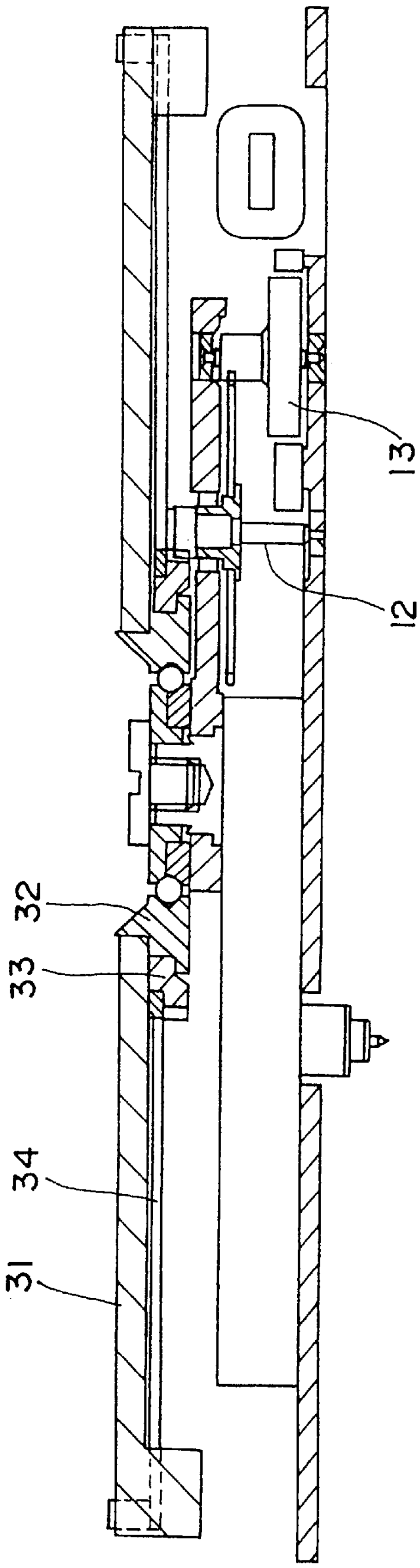
FIG. 12 is a longitudinal section of the inside of a wristwatch provided with the rotary weight block corresponding to the third embodiment.

FIG. 9 is a top plan view of a third embodiment of the rotary weight block of the present invention; FIG. 10 is a sectional view along the line 10—10 in FIG. 9; FIG. 11 is a partly enlarged view showing the fitting conditions between a weight pinion and a rotary weight and between the weight pinion and a shock-absorbing spring corresponding to the third embodiment; and FIG. 12 is a longitudinal section of the inside of a wristwatch provided with the rotary weight block corresponding to the third embodiment.

An rotary weight block 30 in the third embodiment comprises a rotary weight 31, a pinion body 32 which is an outer ring of a bearing including the outer ring and an inner ring, a weight pinion 33, and a shock-absorbing spring 34. Here, the center of the rotary weight 31 is secured to the pinion body 32 and, as shown in FIG. 11, the height of the rotary weight 31 is defined by a shoulder part 32*a* of the pinion body 32.

The rotary weight 31 is firmly secured to the pinion body 32 in this manner so that the rotary weight 31 does not move in the axial direction when the rotary weight 31 is rotated, allowing the rotary weight 31 to rotate smoothly.

The weight pinion 33 is marginally engaged with the outer periphery of the pinion body 32, having an appropriate clearance from an accession part 32*b* of the pinion body 32 and the rotary weight 31. Therefore, the motion of the pinion body 32 corresponding to the rotational motion and reciprocative motion of the rotary weight 31 is not directly transferred to the weight pinion 33.

The shock-absorbing spring 34 is disposed under the rotary weight 31, having a clearance from the rotary weight 31. The center of the spring 34 is secured to the outer periphery of the upper portion of the weight pinion 33, and the spring 34 works in unity with the weight pinion 33. A pair of arms 34*a,* 34*b* of the shock-absorbing spring 34 is considerably bent in these central portions so as to project from the lower portion of the rotary weight 31 outward from a linear side surface 31*a* of the rotary weight 31. Also, the ends of the arms 34*a,* 34*b* projecting from the linear side surface 31*a* are bent to form almost a V shape. The respective ends 34*c,* 34*d* of the arms 34*a,* 34*b* of the shock-absorbing spring 34 are bent upward to form a key shape. Because of these shapes for the pair of arms 34*a,* 34*b* of the shock-absorbing spring 34, the ends 34*c,* 34*d* with a key shape directly contact the linear side surface 31*a* of the rotary weight 31, applying appropriate pressure to the linear side surface 31*a.*

In the rotary weight block 30 of the third embodiment produced in this manner, even if the rotary weight is rotated in either the left or right direction, the rotational energy is transferred to the weight pinion 33 via either of the pair of arms 34*a,* 34*b* of the shock-absorbing spring 34. Thus, the weight pinion 33, rotary weight 31, and the shock-absorbing spring 34 are rotated in unity.

Specifically, mechanical energy obtained by the rotational or reciprocative motion of the rotary weight 31 is transferred to the weight pinion 33 via the shock-absorbing spring 34. The mechanical energy is then transferred to the generator rotor 13 via the generator energy intermediate wheel 12, by which the rotational velocity is accelerated. Specifically, the generator rotor 13 is rotated at a high speed to convert mechanical energy to electrical energy.

The spring constant of the shock-absorbing spring 34 is so designed that, in the case of the rotational force of the rotary weight in ordinary carrying conditions of the electronic wristwatch worn on the human wrist, the shock-absorbing spring 34 is only slightly deformed.

On the other hand, in the case where the rotary weight 31 is rapidly rotated caused for some reason, the arms 34*a,* 34*b* for accepting rotational force from the shock-absorbing spring 34 bend to absorb the rotational energy so that the impact force of the rotary weight 31 is not directly transferred to the weight pinion 33 and the power transmission mechanism succeeding the weight pinion 33.

Fourth Embodiment

Figure 13:
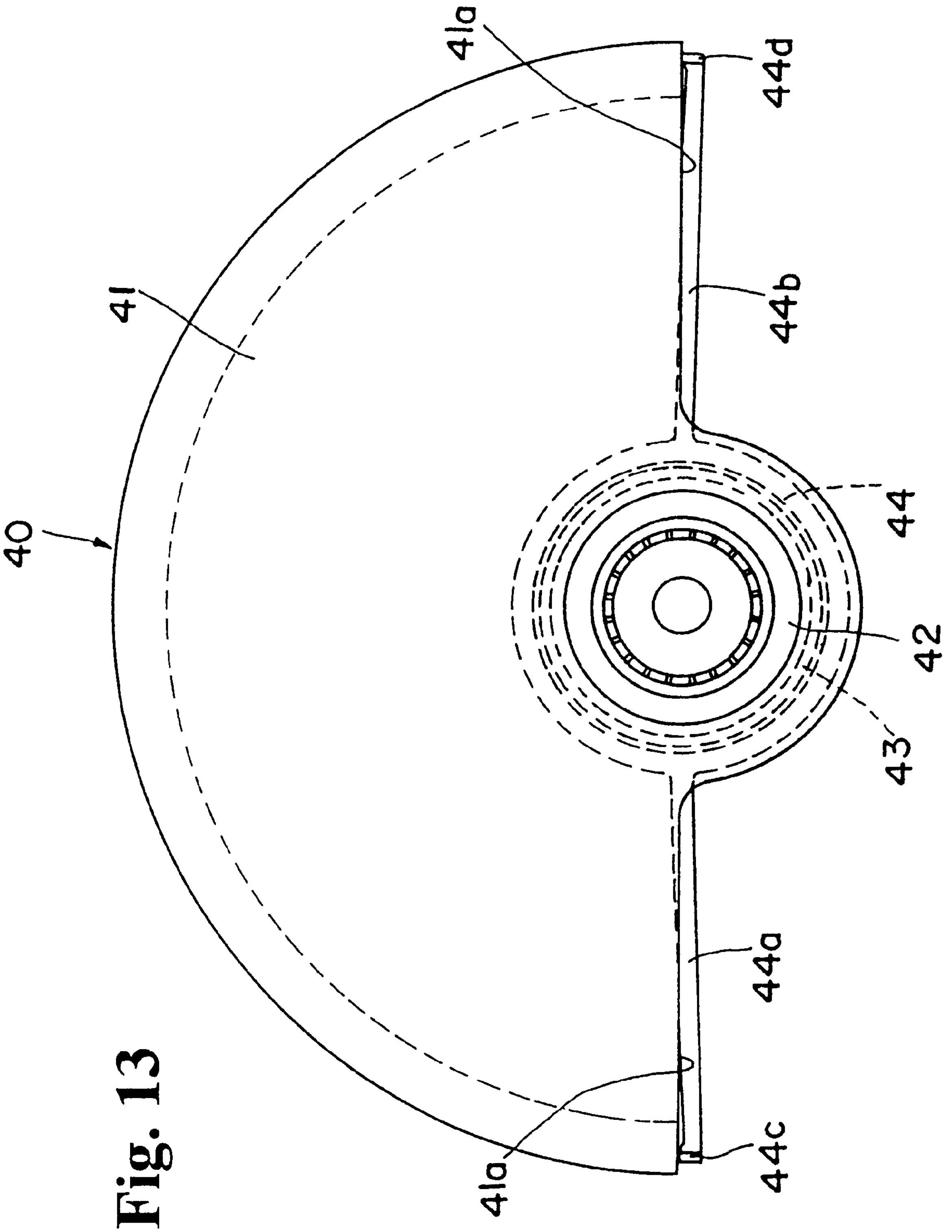
FIG. 13 is a top plan view of a fourth embodiment of the rotary weight block of the present invention.

FIG. 13 is a top plan view of a fourth embodiment of the rotary weight block of the present invention.

A rotary weight block 40 of the fourth embodiment comprises a rotary weight 41, a pinion body 42, a weight pinion 43, and a shock-absorbing spring 44. The fitting conditions between the rotary weight 41 and the pinion body 42 and between the weight pinion 43 and a shock-absorbing spring 44 are the same as those in the third embodiment.

The shock-absorbing spring 44 is provided with a pair of arms 44*a,* 44*b* projecting from the opposite sides of the center thereof at an angle of 180 degrees. The respective ends 44*c,* 44*d* of the arms 44*a,* 44*b* are bent upward to form a key shape. On the pair of arms 44*a,* 44*b,* the ends 44*c,* 44*d* of a key shape directly contact the linear side surface 41*a* of the rotary weight 41, applying appropriate pressure to the linear side surface 41*a.*

The rotary weight block of the fourth embodiment acts similarly to the rotary weight block of the third embodiment.

Fifth Embodiment

Figure 14:
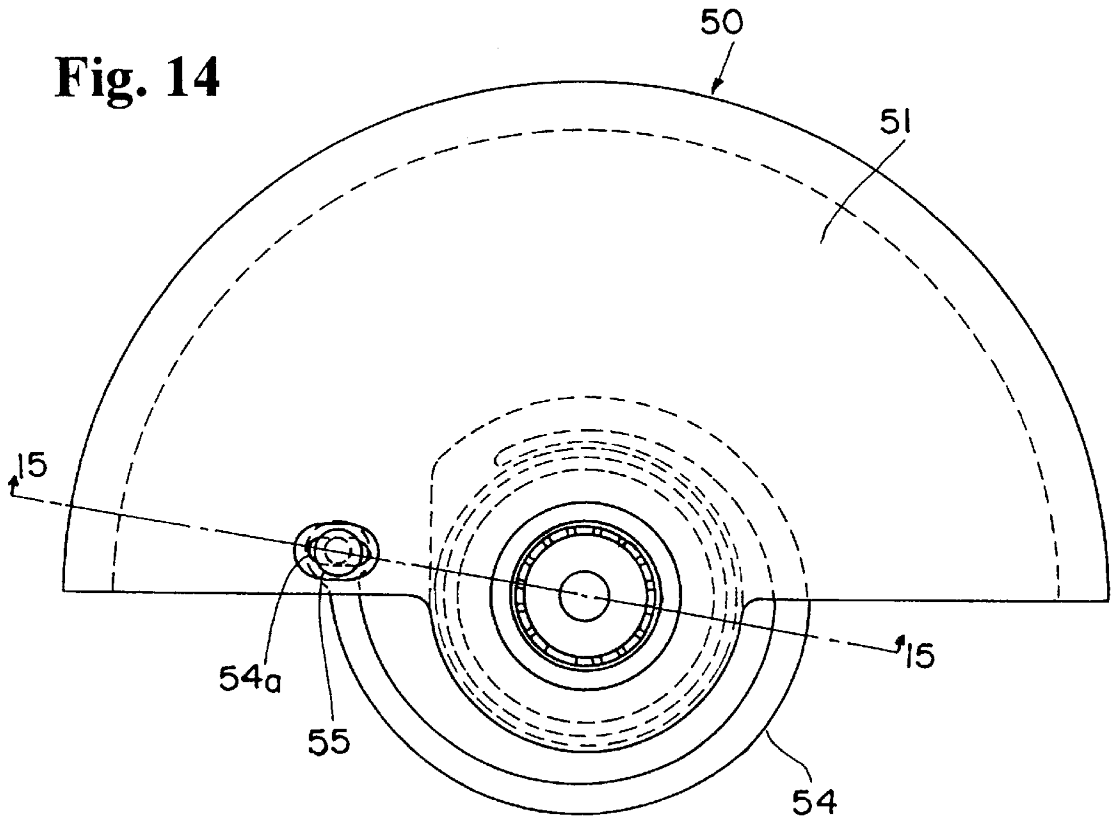
FIG. 14 is a top plan view of a fifth embodiment of the rotary weight block of the present invention.
Figure 15:
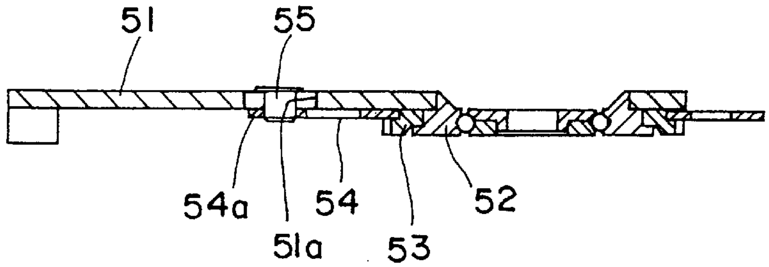
FIG. 15 is a sectional view along the line 15—15 in FIG. 14.

FIG. 14 is a top plan view of a fifth embodiment of the rotary weight block of the present invention and FIG. 15 is a sectional view along the line 15—15 in FIG. 14. In the rotary weight block 50 of the fifth embodiment, the fitting conditions between the rotary weight 51 and the pinion body 52, and between the weight pinion 53 and a shock-absorbing spring 54, are the same as those in the rotary weight block of the third embodiment.

The shock-absorbing spring 54 is in the form of a spiral. The center of the spring 54 is integrally secured to the weight pinion 53 and an end 54*a* of the spring 54 is movably and rotationally inserted into a rectangular opening 51*a* by using a pin 55.

Therefore, in the rotary weight block of this embodiment, the rotation of the rotary weight 51 is transferred to the weight pinion 53 via the shock-absorbing spring 54. In addition, when a large impact is applied to the rotary weight 51 caused by dropping the electronic wristwatch or the like and thereby causing the rotary weight 51 to rapidly rotate, the shock-absorbing spring 54 bends and the end 54*a* of the spring 54 moves in the rectangular opening 5l*a* to absorb the impact torque.

Sixth Embodiment

Figure 16:
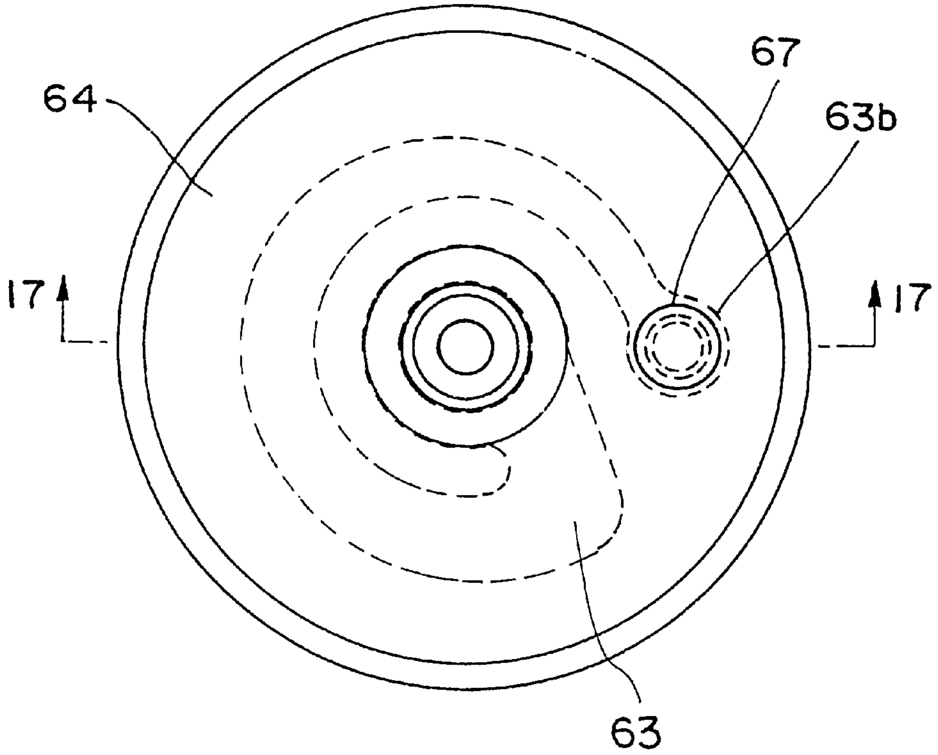
FIG. 16 is a top plan view of a generator energy intermediate wheel showing the relation of the generator energy intermediate wheel to a shock-absorbing spring.
Figure 17:
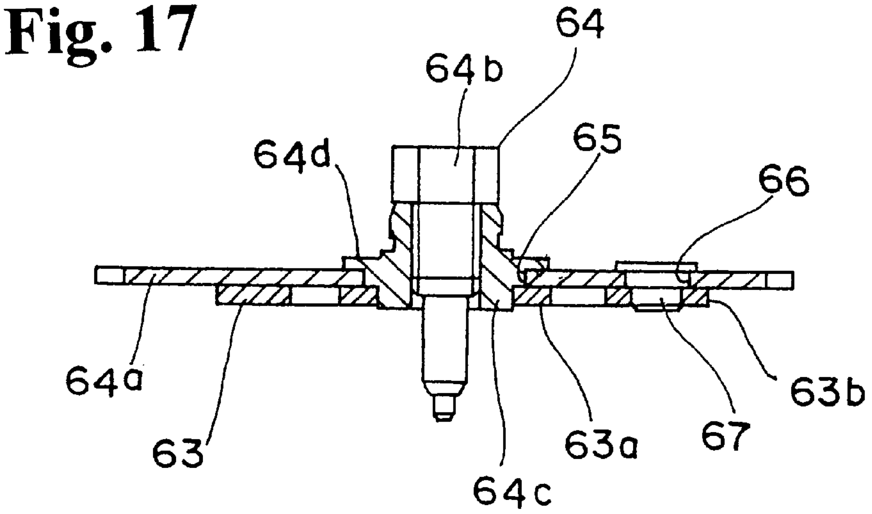
FIG. 17 is a sectional view along the line 17—17 in FIG. 16.

In the sixth embodiment, a shock-absorbing spring is installed under a generator energy intermediate wheel. FIG. 16 is a top plan view of a generator energy intermediate wheel showing the relation of the generator energy intermediate wheel to a shock-absorbing spring; FIG. 17 is a sectional view along the line 17—17 in FIG. 16; and FIG. 18 is a sectional view showing the inside of an electronic wristwatch using an energy intermediate wheel corresponding to the sixth embodiment.

Figure 18:
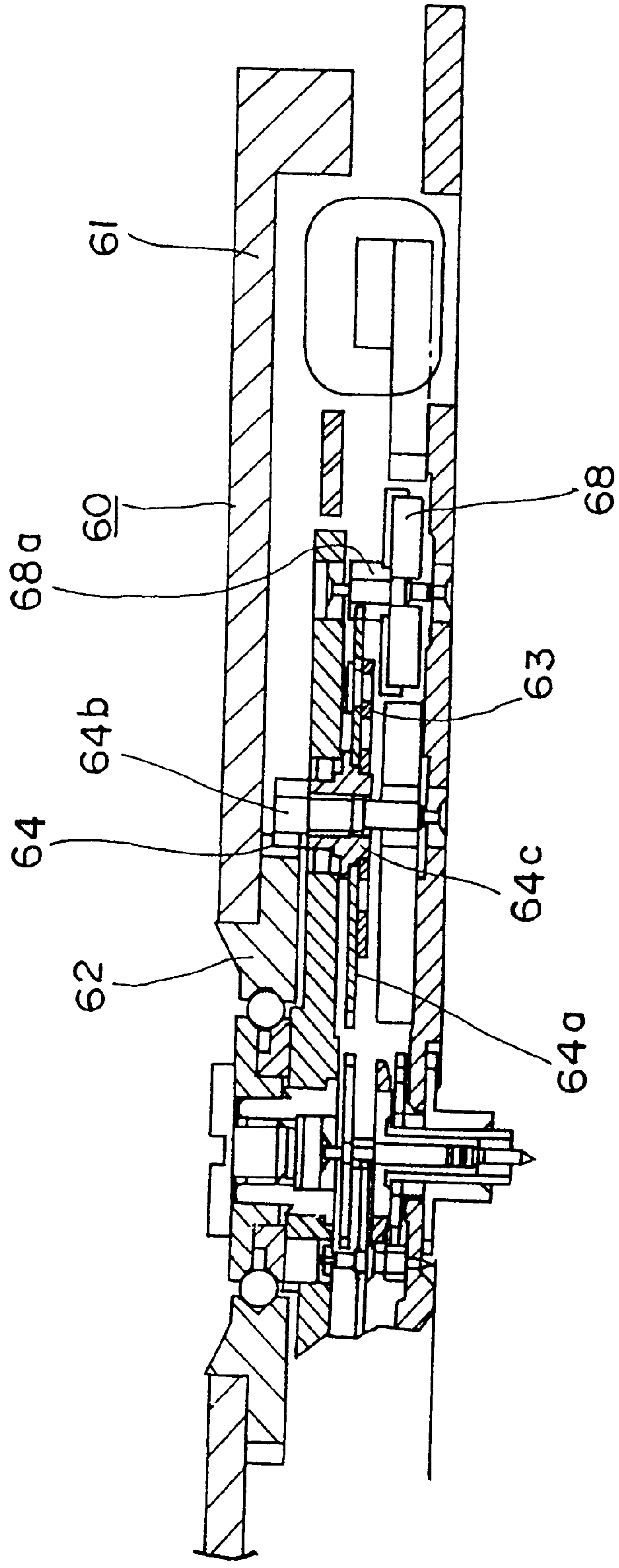
FIG. 18 is a sectional view showing the inside of an electronic wristwatch using a sixth embodiment of the energy intermediate wheel.

As shown in FIG. 18, a rotary weight block 60 comprises a rotary weight 61 and a weight pinion 62, which are integrally joined and rotated in unity. The generator energy intermediate wheel 64 includes a generator energy intermediate gear 64*a*, an energy intermediate pinion 64*b* which engages the weight pinion 62, and an energy intermediate pinion ring 64*c*. The generator energy intermediate wheel 64 engages a rotor pinion 68*a* of a generator rotor 68. Also, a shock-absorbing spring 63 is installed under the generator energy intermediate gear 64*a*.

Specifically, the generator energy intermediate gear 64*a* is supported with an appropriate clearance by and between a center 63*a* of the shock-absorbing spring and a haft part 64*d* of the energy intermediate pinion ring 64*c* integrally formed with the energy intermediate pinion 64*b*. The energy intermediate pinion ring 64*c* is rotatably disposed in center hole 65 of the generator energy intermediate gear 64*a* rotatably disposed in. Also, a pin 67 is inserted into a small hole 66 of the generator energy intermediate gear 64*a* and secured to an end 63*b* of the shock-absorbing spring 63.

Therefore, the rotation of the rotary weight 61 is transferred to the energy intermediate pinion 64*b* via the weight pinion 62. The rotation is then transferred from the energy intermediate pinion 64*b* to the generator energy intermediate gear 64*a* via the shock-absorbing spring 63. The rotation is further transferred to the generator rotor 68 via the rotor pinion 68*a*. When the rotary weight 61 is rapidly rotated caused for some reason such as dropping the wristwatch, violent movement of the hand, or the like, the spring 63 united with the generator energy intermediate wheel 64 bends to absorb the rotational energy.

In the present invention, a shock-absorbing spring may be arranged at some positions between the rotary weight and the weight pinion. Also, the generator energy intermediate wheel may be provided with a shock-absorbing spring and plural shock-absorbing springs may be arranged between the rotary weight and the power generator rotor to further improve the impact resistance.

INDUSTRIAL APPLICABILITY OF THE INVENTION

As is clear from the above illustrations, the small electronic apparatus equipped with a generator according to the present invention can be utilized for a variety of small electronic apparatuses capable of being carried on the arm or the body, such as an electronic wristwatch, a carrying-pager, or a passometer.

What is claimed is:

1. A small electronic apparatus comprising:

a rotary weight;

a power transmission mechanism connected to the rotary weight for transmitting a motion of the rotary weight;

a power generator rotor driven by the power transmission mechanism;

a generator coil block for converting mechanical energy obtained by the motion of the rotary weight to electrical energy, said generator coil block generating induction voltage based on an operation of the power generator rotor; and at least one shock-absorbing spring provided between the rotary weight and the power generator rotor, said at least one shock-absorbing spring, when an impact is applied to the rotary weight, absorbing the impact between the rotary weight and the power generator rotor to protect the small electronic apparatus from the impact.

2. The small electronic apparatus according to claim 1, wherein the power transmission mechanism includes a weight pinion and a generator energy intermediate wheel disposed between the power generator rotor and the weight pinion, the rotary weight being rotatably installed on the weight pinion, a center of the shock-absorbing spring being secured to the weight pinion, an end of the spring being secured to the rotary weight, and rotation of the rotary weight being transferred to the weight pinion via the shock-absorbing spring.

3. The small electronic apparatus according to claim 1, wherein the power transmission mechanism includes a pinion body, a weight pinion and a generator energy intermediate wheel disposed between the power generator rotor and the weight pinion, the rotary weight being secured to the pinion body, the weight pinion being rotatably installed on an outer periphery of the pinion body, a center of the shock-absorbing spring being secured to the weight pinion, an end of the spring being secured to the rotary weight, and rotation of the rotary weight being transferred to the weight pinion via the shock-absorbing spring.

4. The small electronic apparatus according to claim 1, wherein the power transmission mechanism includes a weight pinion and a generator energy intermediate wheel which is provided with a generator energy intermediate gear and an energy intermediate pinion for transferring force from the weight pinion, the generator energy intermediate gear being rotatably installed on the energy intermediate pinion, a center of the shock-absorbing spring being secured to the intermediate pinion, an end of the spring being secured to the generator energy intermediate gear, and rotation of the rotary weight being transferred to the generator energy intermediate gear via the shock-absorbing spring.

5. The small electronic apparatus according to claim 2, wherein the shock-absorbing spring is spiral in shape, an end of the spring and the rotary weight rotatably are secured by a pin.

6. The small electronic apparatus according to claim 2, wherein the shock-absorbing spring is provided with an arm projecting from a center thereof, an end of the arm being directly contacted to a side edge of the rotary weight.

7. The small electronic apparatus according to claim 1, wherein said at least one shock-absorbing spring operates to absorb the impact only when the shock is above a predetermined level.

* * * * *